(12) United States Patent
Lei

(10) Patent No.: US 9,965,154 B2
(45) Date of Patent: May 8, 2018

(54) MOBILE TERMINAL-BASED PHOTOGRAPH DELETION METHOD AND MOBILE TERMINAL

(71) Applicant: HUIZHOU TCL MOBILE COMMUNICATION CO., LTD., Huizhou, Guangdong (CN)

(72) Inventor: Ming Lei, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 421 days.

(21) Appl. No.: 14/395,963

(22) PCT Filed: Jul. 29, 2013

(86) PCT No.: PCT/CN2013/080275
§ 371 (c)(1),
(2) Date: Oct. 21, 2014

(87) PCT Pub. No.: WO2014/063508
PCT Pub. Date: May 1, 2014

(65) Prior Publication Data
US 2015/0339035 A1 Nov. 26, 2015

(30) Foreign Application Priority Data
Oct. 24, 2012 (CN) .......................... 2012 1 0409322

(51) Int. Cl.
G06F 17/30 (2006.01)
G06F 3/01 (2006.01)
(Continued)

(52) U.S. Cl.
CPC ...... *G06F 3/04842* (2013.01); *G06F 3/04883* (2013.01); *G06F 17/30117* (2013.01);
(Continued)

(58) Field of Classification Search
CPC ...... G06F 3/048; G06F 3/041; G06F 3/04842; G06F 3/04845; G06F 3/0486;
(Continued)

(56) References Cited

U.S. PATENT DOCUMENTS

2004/0019759 A1 1/2004 Adelman
2006/0164535 A1 7/2006 Oyama
(Continued)

FOREIGN PATENT DOCUMENTS

| CN | 1398133 A | 2/2003 |
|----|-----------|--------|
| CN | 1622666   | 6/2005 |

(Continued)

OTHER PUBLICATIONS

Crazy Cellphone Addict, Android 4.1 Jelly Bean update diary, forum, Aug. 28, 2012, p. 5 and 6, Xiaomi Community forum, Beijing China.

(Continued)

*Primary Examiner* — Ting Lee
(74) *Attorney, Agent, or Firm* — Ladas & Parry LLP

(57) ABSTRACT

A mobile terminal and a photograph deletion method thereof are disclosed. The method comprises: pre-storing in the mobile terminal a preset touch gesture used for deleting a picture from a photography interface during photography, and mapping the preset touch gesture to a deletion command; receiving a user's touchscreen command to determine whether the user's touch gesture matches the preset touch gesture when the photography interface of the mobile terminal requires deletion of a picture; if yes, determining a deletion target according to action points of the touch gesture; and moving deletion target into a recycling bin. The captured picture is rapidly deleted from the photography interface through a simple touchscreen gesture without (Continued)

exiting the camera application program and with no need to manually switch an operation interface.

14 Claims, 4 Drawing Sheets

(51) Int. Cl.
  *G06F 3/048* (2013.01)
  *G06F 3/0484* (2013.01)
  *G06F 3/0488* (2013.01)

(52) U.S. Cl.
  CPC ........ *G06F 17/30132* (2013.01); *G06F 3/017* (2013.01); *G06F 3/048* (2013.01); *G06F 3/0488* (2013.01); *G06F 3/04845* (2013.01)

(58) Field of Classification Search
  CPC .... G06F 3/0488; G06F 3/04883; G06F 3/017; G06F 17/30117; G06F 17/30132
  See application file for complete search history.

(56) References Cited

U.S. PATENT DOCUMENTS

| | | | | |
|---|---|---|---|---|
| 2008/0168403 | A1* | 7/2008 | Westerman | G06F 3/04883 715/863 |
| 2009/0222757 | A1* | 9/2009 | Gupta | H04N 5/44543 715/776 |
| 2010/0090971 | A1* | 4/2010 | Choi | G06F 3/04883 345/173 |
| 2011/0072393 | A1* | 3/2011 | Wilairat | G06F 3/0488 715/811 |
| 2012/0172086 | A1* | 7/2012 | Choi | H04N 1/0044 455/556.1 |
| 2012/0233571 | A1* | 9/2012 | Wever | G06F 3/048 715/835 |
| 2013/0101219 | A1* | 4/2013 | Bosworth | G06F 17/3079 382/195 |
| 2014/0078134 | A1* | 3/2014 | Kainiemi | G06F 3/0483 345/419 |

FOREIGN PATENT DOCUMENTS

| | | |
|---|---|---|
| CN | 101539840 | 9/2009 |
| CN | 101630231 | 1/2010 |
| CN | 101794203 A | 8/2010 |
| CN | 102023735 A | 4/2011 |
| CN | 102929550 A | 2/2013 |
| WO | 2008030976 | 3/2008 |
| WO | 2010/147497 A1 | 12/2010 |

OTHER PUBLICATIONS

Kodak, Kodak Slice Touchscreen Camera extended user guide. official site, Dec. 31, 2009, all pages, Kodak, Rochester, New York 14650 U.S.A.

Daniel Chivers, Peter Rodgers, gesture-based input for drawing schematics on a mobile device, p. 127-134, Jul. 13, 2011, Department of Computer Science, University of Kent, Canterbury, United Kingdom.

* cited by examiner

MOBILE TERMINAL-BASED PHOTOGRAPH DELETION METHOD AND MOBILE TERMINAL

CROSS REFERENCE TO RELATED APPLICATION

This application claims the priority of International Application No. PCT/CN2013/080275, filed on Jul. 29, 2013, which claims priority to Chinese Application No. 201210409322.2, filed on Oct. 24, 2012. The entire disclosures of each of the above applications are incorporated herein by reference.

TECHNICAL FIELD OF THE INVENTION

The present invention relates to a mobile terminal technology, and more particularly, to a mobile terminal-based photograph deletion method and a mobile terminal.

BACKGROUND OF THE INVENTION

With the continuous development of electronic technology and the gradual improvement of the quality of human life, various intelligent mobile terminals, such as smart phones and tablets, are widely used.

Most of the current intelligent devices are equipped with cameras in support of photographing and video recording functions. It is very convenient for users to take pictures and make films at all times and all places by using these intelligent mobile terminals. The captured pictures with which the users are not satisfied can also be instantly deleted. There are two approaches to instantly deleting pictures during photography in existing intelligent mobile terminals. One of the two approaches is based on the Android system 4.0 and older versions. Since the camera application does not have a deletion operation, the user has to exit the camera application and then finishes the picture deletion in other applications such as a gallery application. This interrupts the normal photographing process and is not convenient for the user. The other approach to instantly deleting pictures is based on the Android system 4.1 and higher versions. The user can proceed with picture deletion in the camera application but has to manually switch between different interfaces. Also, the user needs to confirm each deletion, and the operation is thus redundant.

Therefore, the conventional skills still need to be improved upon and developed.

SUMMARY OF THE INVENTION

For the above drawbacks existing in the conventional skills, the technical problem to be solved in the present invention is to provide a mobile terminal-based photograph deletion method and a mobile terminal for solving the problem of rapidly deleting a captured picture in using an intelligent mobile terminal to take pictures.

To solve above technical problem, one technical scheme adopted in the present invention is to provide a mobile terminal-based photograph deletion method, which comprises steps of:

pre-storing a preset touch gesture in a mobile terminal and mapping the preset touch gesture to a deletion command;

receiving a touch gesture by using a touchscreen and determining whether the touch gesture indicates a click command when the mobile terminal is used to take a photograph;

determining whether the touch gesture matches the preset touch gesture when the touch gesture is determined not to indicate the click command;

determining a target according to action points of the touch gesture when the touch gesture matches the preset touch gesture; and moving the target to a pre-established recycle bin and controlling the mobile terminal to return to photography mode.

In the mobile terminal-based photograph deletion method, the target comprises a picture or a short film.

The mobile terminal-based photograph deletion method further comprises a step of receiving a target retrieving command by the mobile terminal for recovering the target from the recycle bin to a location where the target was before the target was deleted or a specified location after the step of moving the target to the pre-established recycle bin and controlling the mobile terminal to return to photography mode.

In the mobile terminal-based photograph deletion method, the preset touch gesture is an X-shaped gesture on the touchscreen of the mobile terminal.

In the mobile terminal-based photograph deletion method, the step of determining whether the touch gesture is the preset touch gesture comprises:

determining whether the touch gesture satisfies all of the following conditions:

A. two lines drawn by the touch gesture are approximate to straight lines;

B. the two lines drawn by the touch gesture have only one intersection point and the intersection point is at a middle part of three equal parts of the two lines; and C. an angle between the two lines ranges from 45 to 135 degrees;

determining that the touch gesture matches the X-shaped gesture when all three of the conditions A, B, and C are satisfied, and determining that the touch gesture does not match the X-shaped gesture when any one of the three conditions A, B, and C is not satisfied.

In the mobile terminal-based photograph deletion method, the recycling bin caches in chronological order a preset number of targets deleted when taking photographs.

In the mobile terminal-based photograph deletion method, the preset number is 10, and wherein the step of moving the target to the pre-established recycle bin and controlling the mobile terminal to return to photography mode comprises:

when moving the target to the pre-established recycling bin and detecting that the number of cached targets in the recycling bin is already 10, deleting the cached target first put into the recycling bin and then moving the target to the recycling bin.

In another aspect, one technical scheme adopted in the present invention is to provide a mobile terminal-based photograph deletion method, which comprises steps of:

pre-storing a preset touch gesture in a mobile terminal and mapping the preset touch gesture to a deletion command;

receiving a touch gesture by using a touchscreen and determining whether the touch gesture matches the preset touch gesture when the mobile terminal is used to take a photograph;

determining a target according to action points of the touch gesture when the touch gesture matches the preset touch gesture; and moving the target to a pre-established recycle bin and controlling the mobile terminal to return to photography mode.

In the mobile terminal-based photograph deletion method, the target comprises a picture or a short film.

The mobile terminal-based photograph deletion method further comprises a step of receiving a target retrieving command by the mobile terminal for recovering the target from the recycle bin to a location where the target was before the target was deleted or a specified location after the step of moving the target to the pre-established recycle bin and controlling the mobile terminal to return to photography mode.

In the mobile terminal-based photograph deletion method, the preset touch gesture is an X-shaped gesture on the touchscreen of the mobile terminal.

In the mobile terminal-based photograph deletion method, the step of determining whether the touch gesture matches the preset touch gesture comprises:

receiving the touch gesture by using the touchscreen when the mobile terminal is used to take photographs;

determining whether the touch gesture satisfies all of the following conditions:

A. two lines drawn by the touch gesture are approximate to straight lines;

B. the two lines drawn by the touch gesture have only one intersection point and the intersection point is at a middle part of three equal parts of the two lines; and C. an angle between the two lines ranges from 45 to 135 degrees;

determining that the touch gesture matches the X-shaped gesture when all three of the conditions A, B, and C are satisfied, and determining that the touch gesture does not matches the X-shaped gesture when any one of the three conditions A, B, and C is not satisfied.

In the mobile terminal-based photograph deletion method, the recycling bin caches in chronological order a preset number of targets deleted when taking photographs.

In the mobile terminal-based photograph deletion method, the preset number is 10, and wherein the step of moving the target to the pre-established recycle bin and controlling the mobile terminal to return to photography mode comprises:

when moving the target to the pre-established recycling bin and detecting that the number of cached targets in the recycling bin is already 10, deleting the cached target first put into the recycling bin and then moving the target to the recycling bin.

In still another aspect, one technical scheme adopted in the present invention is to provide a mobile terminal adopting the mobile terminal-based photograph deletion method, which comprises:

an arrangement module for pre-storing a preset touch gesture in the mobile terminal and establishing a correspondence between the preset touch gesture and a deletion command;

a gesture determining module for receiving a touch gesture by using a touchscreen and determining whether the touch gesture matches the preset touch gesture when the mobile terminal is used to take a photograph; if yes, outputting a target determination signal;

a target determining module for receiving the target determination signal and determining a target according to action points of the touch gesture; and a deletion control module for moving the target determined by the target determining module to a pre-established recycle bin and controlling the mobile terminal to automatically return to photography mode when the gesture determining module determines that the touch gesture matches the preset touch gesture.

In the mobile terminal, the target comprises a picture or a short film.

The mobile terminal further comprises:

a target recovering module for receiving a target retrieving command and recovering the target from the recycle bin to a location where the target was before the target was deleted or a specified location; and the arrangement module further for presetting the recycle bin presetting the recycling bin used to cache in chronological order a preset number of targets deleted when taking photographs.

In the mobile terminal, the preset touch gesture is an X-shaped gesture, and wherein the gesture determining module further comprises:

a first determination unit for determining whether lines drawn by the touch gesture are two lines approximate to straight lines; if yes, notifying a second determination unit to work; if no, determining that the touch gesture does not match the X-shaped gesture;

the second determination unit for determining whether the two lines drawn by the touch gesture have only one intersection point and the intersection point is at a middle part of three equal parts of the two lines; if yes, notifying a third determination unit to work; if no, determining that the touch gesture does not match the X-shaped gesture;

the third determination unit for determining whether an angle between the two lines ranges from 45 to 135 degrees; if yes, determining that the touch gesture matches the X-shaped gesture; if no, determining that the touch gesture does not match the X-shaped gesture.

In the mobile terminal, the preset number is 10.

The mobile terminal and the mobile terminal-based photography deletion method provided in the present invention execute a picture deletion command according to an X-shaped gestured made by the user on the photography interface of the mobile terminal. The operation is simple, quite visual, and might be easy to be accepted by the user. Also, wrong operations do not occur easily, and thus the probability of error, resulting in deleting the pictures the user does not want to delete, is greatly reduced. Also, the mobile terminal has a new function added. By means of the present invention, the captured picture can be rapidly deleted from the photography interface with no need to switch between different interfaces or application programs. The implement is visual, better fits the user habit of thought, and reduces the probability of user error in operation. In addition, by means of the present invention, it is convenient for the user to retrieve the deleted pictures. Convenience is enhanced for the user.

BRIEF DESCRIPTION OF THE DRAWINGS

In order to clearly illustrate the technical schemes provided in the embodiments of the present invention, the appending drawings needed in the descriptions of the embodiments are briefly introduced as follows. Obviously, the appending drawings in the following descriptions are merely embodiments of the present invention. A person of ordinary technical skill in this field can always deduce other drawings based on these appending drawings without exerting any creative effort.

DETAILED DESCRIPTION OF THE INVENTION

In order to make the objectives, technical schemes, and advantages of the present invention clearer and more definite, the present invention will be described in further detail as follows in conjunction with appending drawings and embodiments. It should be understood that the specific embodiments described herein are merely for explaining the present invention, but the present invention is not limited thereto.

The mobile terminal-based photograph deletion method provided in the present invention is not only applicable to the Android system 4.1, but also the Android system 4.0 and lower versions. The aforesaid method can also be migrated to other intelligent mobile terminal systems. Before the mobile terminal-based photograph deletion method of the present invention is implemented, a recycle bin needs to be established in the mobile terminal for caching the targets, including pictures or short films, deleted by a user on a photography interface such that it is convenient for the user to retrieve the deleted pictures or short films in a certain period of time.

Figure 1:
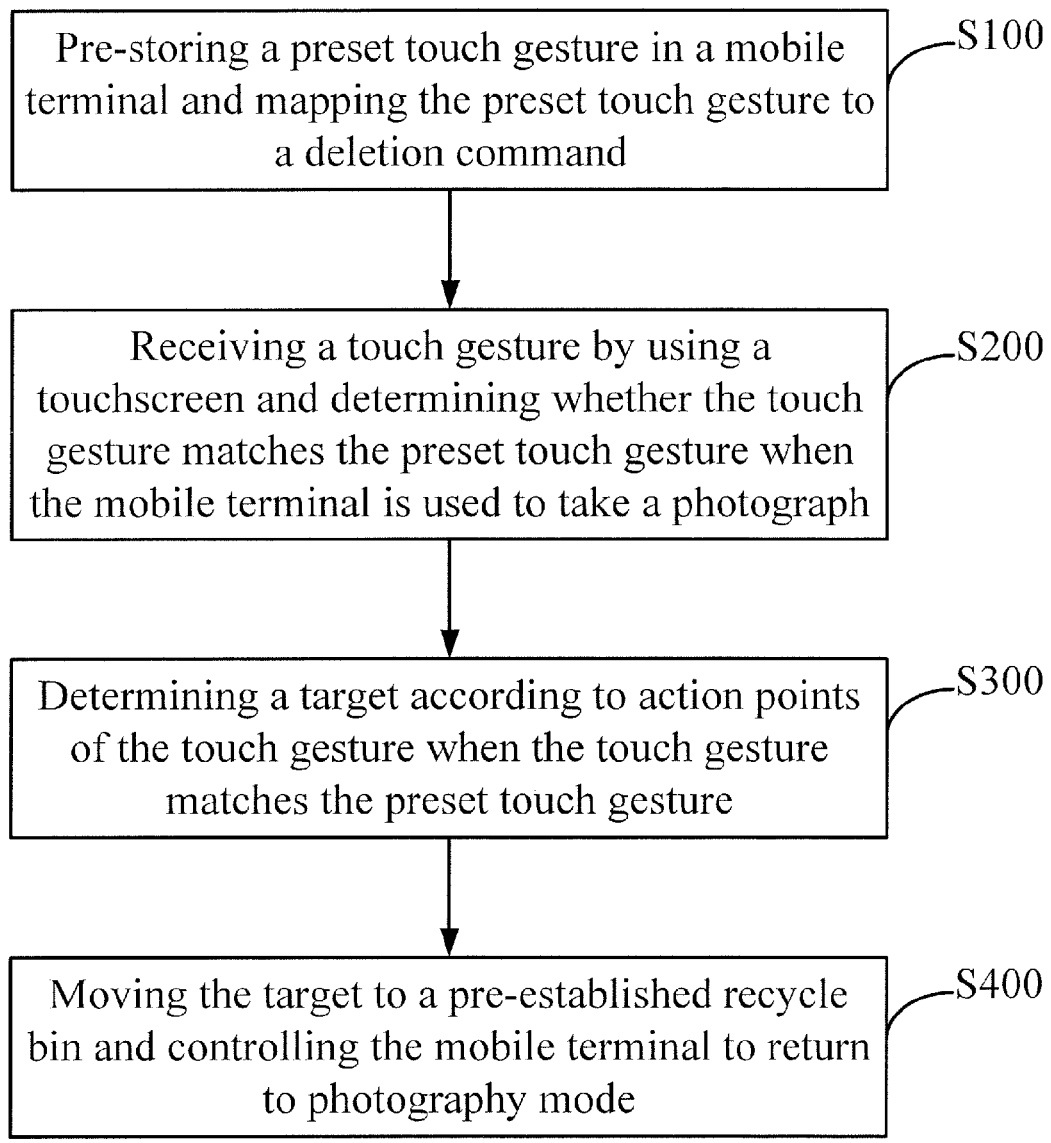
FIG. 1 is a flow chart of a mobile terminal-based photograph deletion method in accordance with an embodiment of the present invention.

Please refer to FIG. 1, which is a flow chart of a mobile terminal-based photograph deletion method in accordance with an embodiment of the present invention. In the present embodiment, the photograph deletion method comprises the following steps.

In Step 100, a preset touch gesture used for deleting a target on a photography interface during photography is pre-stored in a mobile terminal, and the preset touch gesture is mapped to a picture deletion command. Preferably, in the present embodiment, an X-shaped gesture made by a user on the photography interface stores as the preset touch gesture for deleting the target on the photography interface, and the correspondence between the X-shaped gesture and the deletion command is established.

In Step 200, when the photography interface of the mobile terminal requires deletion of a picture, a touch gesture command made by the user to delete the picture is received by using a touchscreen, and whether the touch gesture made by the user matches the preset touch gesture for deleting the target is determined. The present embodiment is to determine whether the user touch gesture matches the X-shaped gesture.

In Step 300, when the touch gesture matches the preset touch gesture for deleting the target, a deletion target is determined according to action points of the touch gesture. In the present invention, practicably, the deletion target also includes a short film except for the picture. The present embodiment is exemplified only by pictures.

In Step 400, the deletion target is controlled to move into a recycling bin, and the mobile terminal is controlled to automatically return to photography mode.

Preferably, in the present embodiment, if the user wants to retrieve the deleted picture that was deleted on the photography interface, a corresponding picture can be found in the recycle bin and recovered to a place where the picture was before the picture was deleted or other specified locations.

It needs to be explained that the recycle bin in the present embodiment is located at a DCIM directory and is named as "recycled". The recycle bin may cache in chronological order 10 (this value can be set by the user according to the user's needs) pictures recently deleted by the user during photography. Accordingly, by way of the recycling bin, the user can recover 10 pictures recently deleted on the photography interface. The recycle bin does not preserve too many pictures as long as the demand for retrieving the deleted picture in a short time can be met. In such a way, the recycle bin occupies much less space and the operation to description of the recycle bin is thus very fast. Also, it is not necessary to manage and maintain the recycle bin if the user does not want to retrieve deleted pictures. When the recycle bin has 10 pictures already and more pictures are needed to be put in, API (Application Program Interface) is firstly launched for thoroughly deleting the picture first put into the recycle bin from the system and then moving the desired picture into the recycling bin. The pictures thoroughly deleted may not be recovered.

By the photograph instant deletion method of the present embodiment, the user can not only do the X-shaped gesture on a thumbnail on the photography interface to delete a corresponding picture, but also click the thumbnail on the photography interface to enter ApopoShare™ window to enlarge and preview the picture and then do the X-shaped gesture on the enlarged preview picture to delete the current preview object.

The principle of determining the X-shaped gesture made by the user on the touchscreen in the embodiments of the present invention is described below. After the user touches the screen, the system will report the touchevent (touchevent) to an application program. The touchevent includes the touch coordinate (touchX, touchY). By the variation of touch coordinates, the application program firstly determines whether the touch gesture indicates a click command. The touch point moves in the X-shaped gesture while the click command is characterized by not moving the touch point after the click. Accordingly, if the touch point moves, the determination will show that it is not a click event, and whether the touch gesture made by the user matches the X-shaped gesture is further determined. The steps to determine the X-shaped gesture is described below.

The first step is determination and estimation of lines. Whether lines drawn by the user are two lines approximate to straight lines is determined. That is, this step determines whether the straightness of the lines drawn by the user meets the requirement. The straightness is defined by the maximum of a ratio of the sum of the distance between a point of a line and a start point of the line and the distance between said point and an end point of the line to the distance between the start point and the end point. Determination of the straightness can be carried out by the following pieces of pseudocode. If the straightness of any one of the two lines is determined to not meet the requirement, the determination is then terminated and the mobile terminal is controlled to return to the state before the user had touched the touchscreen.

```
privatebooleanisLine(float x, float y)
{
    boolean Value = true;
        defining a criteria for the straightness;
```

Step 1: calculating the distance between the start point and the end point respectively for the two lines;

Step 2: calculating the sum of the distance between a point and the start point on a corresponding line and the distance between said point and the end point on the corresponding line respectively for the respective points on the two lines;

Step 3: comparing the distance sum calculated in Step 2 and the distance calculated for the corresponding line in Step 1, and finding out the maximum of its ratio;

If the maximum ratio in Step 3 is larger than the straightness criteria, it shows that the corresponding line is not approximate to a straight line, and the corresponding line is determined to not meet the requirement such that

```
Value = false;
    return Value;
}
```

The second step is determination and estimation of an intersection point. That is, whether the two lines drawn by the user have only one intersection point is further determined when both of the two lines are determined to be approximate to straight lines. Only when the two lines have only one intersection point and the intersection point is at a middle part of three equal parts of the two lines, the intersection point is determined to be qualified, and then the determination enters the third step. Otherwise, it is determined that the current touch gesture made by the user does not match the X-shaped gesture for deleting the picture. The above determination is terminated and the mobile terminal is controlled to return to the state before the user had touched the touchscreen.

The third step is determination and estimation of an included angle. When the second step determines that the intersection point of the two lines is qualified, the third step further determines whether the angle between the two lines meets the requirement. That is, whether the angle between the lines connecting the intersection point and the two start points of the two lines ranges from 45 to 135 degrees is determined. If satisfied, the user's touch gesture is determined to match the X-shape gesture for deleting the picture and the process is further controlled to delete the corresponding picture. Otherwise, it is determined that the touch gesture is not the X-shaped gesture for deleting the picture. The above determination is terminated and the mobile terminal is controlled to return to the state before the user had touched the touchscreen.

In the present embodiment, by means of the above determination and estimation on the user touch gesture, wrong operations can be effectively avoided. On this basis, the target picture the user wants to delete is determined according to the action points of the user's touch gesture. Since the above estimation of quality on the user's touch gesture is proceeded, the deletion operation during photography does not need to be confirmed by the user and the user's operation is thus simplified.

Figure 2:
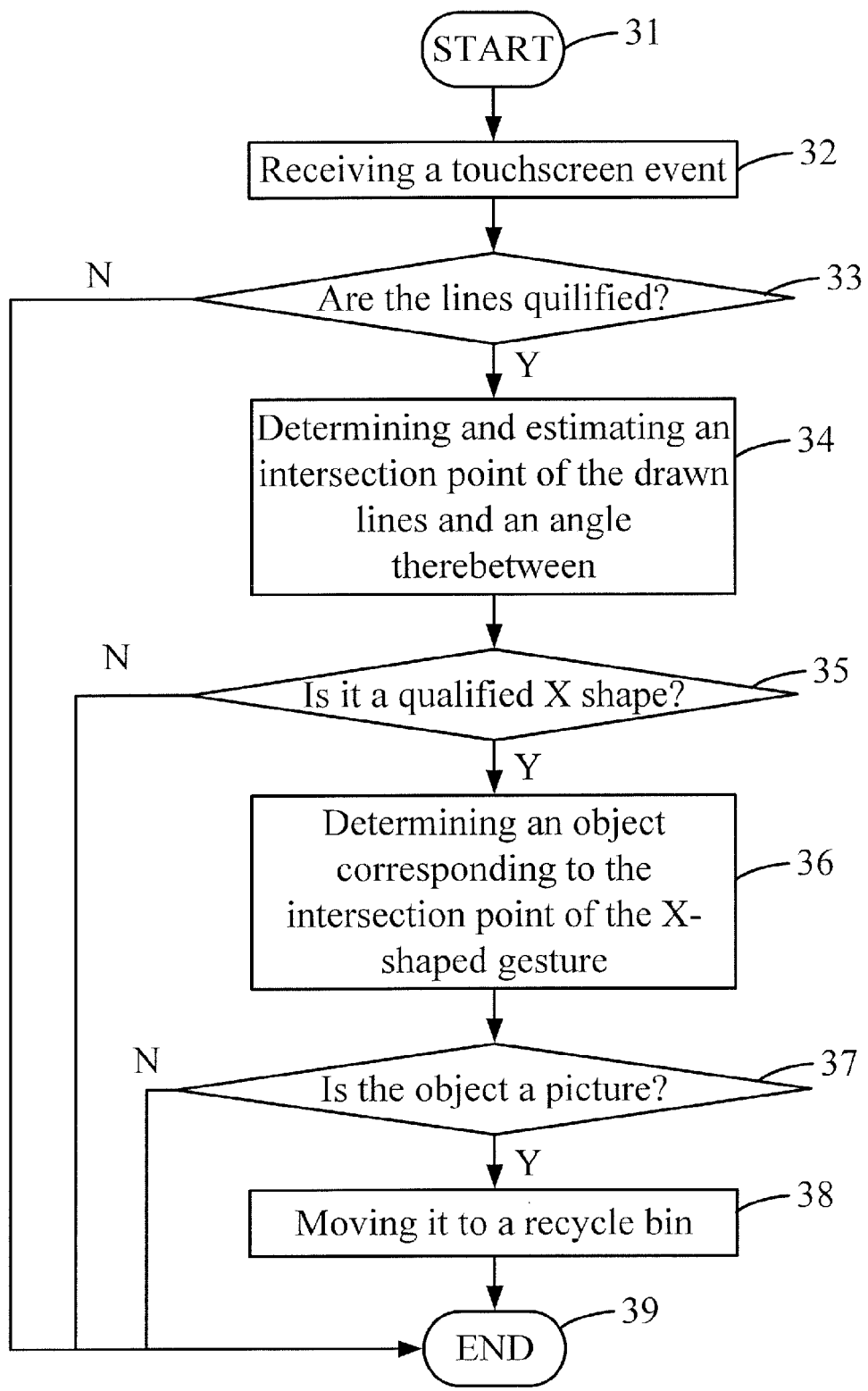
FIG. 2 is a flow chart of a specific algorithm of a mobile terminal-based photograph deletion method in accordance with an embodiment of the present invention.

FIG. 2 is a flow chart of a specific algorithm of a mobile terminal-based photograph deletion method in accordance with an embodiment of the present invention. As shown in FIG. 2, the specific steps in the present embodiment are described below.

In Step 31, the mobile terminal is firstly in photography mode.

In Step 32, the user performs touchscreen operations on the mobile terminal.

In Step 33, the user's touchscreen operations are received and whether the lines drawn by the touch gesture meet the requirement is determined. That is, it is determined whether the mark drawn by the touch operations is two lines approximate to straight lines. If yes, go to Step 34; otherwise, go to Step 39.

In Step 34, an intersection point of the two lines and an angle between the two lines are further determined.

In Step 35, it is determined whether the requirement for the X-shaped gesture for deleting the picture is met. If yes, go to Step 36; otherwise, go to Step 39.

In Step 36, the position corresponding to the touch gesture made on the touchscreen is determined. That is, the deletion target is determined according to a location where the intersection point of the X-shaped gesture is at.

In Step 37, it is determined whether the target is a picture. If yes, go to Step 38; otherwise, go to Step 39.

In Step 38, the corresponding picture is moved to the recycling bin.

In Step 39, the process is terminated.

As can be seen, by means of above algorithm, the captured picture can be rapidly deleted merely through the touchscreen operation gesture when the mobile terminal is in photography mode. The deletion gesture is strictly determined and estimated. Accordingly, the probability of erroneous determination is very small, and a step of confirming the deletion by the user is omitted when performing the deletion. Also, the execution of picture deletion does not affect the work of the camera application program. The user does not need to switch an operation interface, and convenience is provided for the user.

Figure 3:
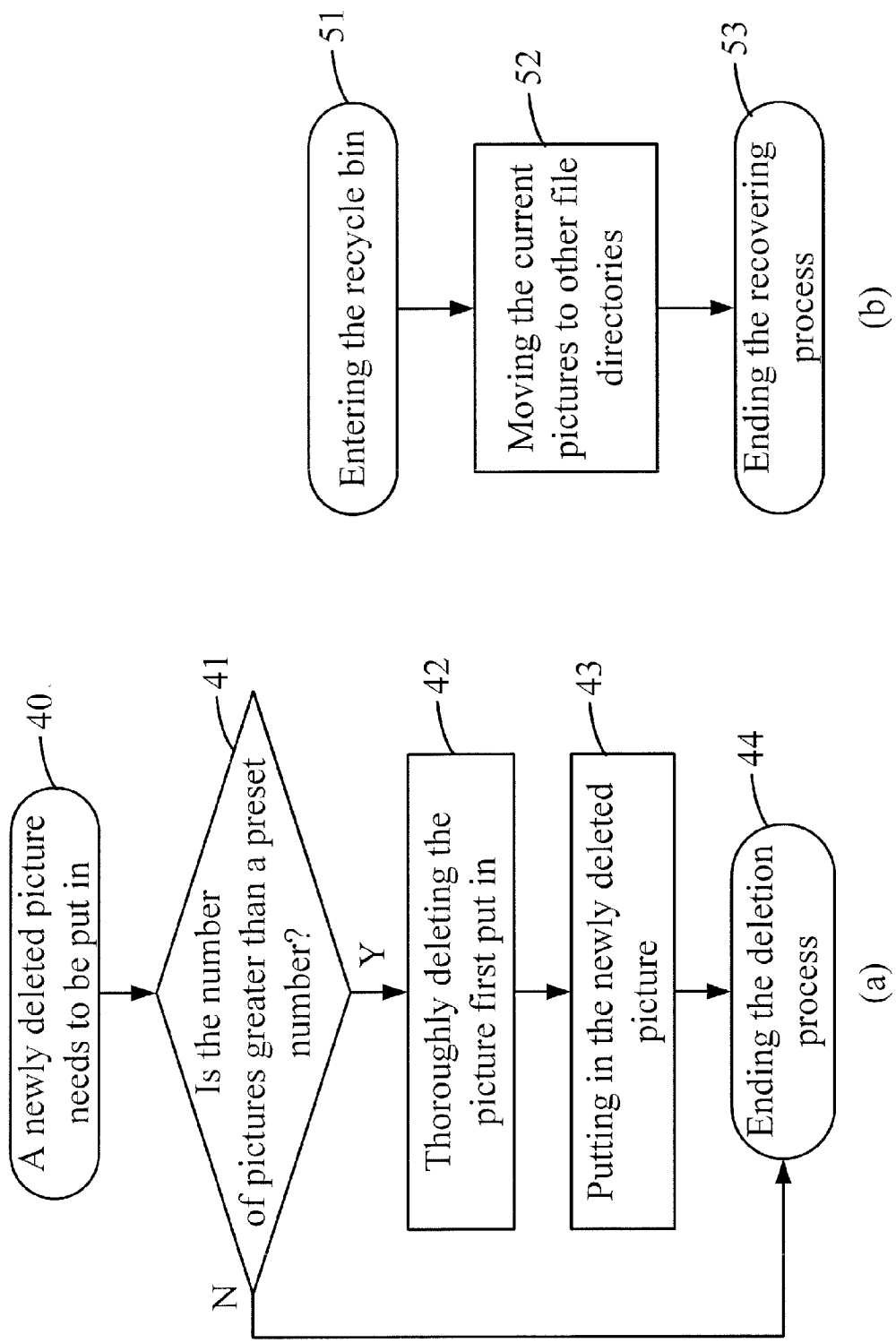
FIG. 3 is a flow chart of a recycle bin process of a mobile terminal-based photograph deletion method in accordance with the present invention.

After deleting pictures during photography through the above embodiment of the present invention, the user can further retrieve the recently deleted pictures from the recycle bin and recover the pictures to their original locations or other specified file directories. The management to the pictures by the recycle bin is shown specifically in FIG. 3. FIG. 3(a) shows a deletion stage. FIG. 3(b) shows a picture recovering stage.

The specific steps to the picture deletion stage are described below.

In Block 40, when the user deletes a picture on the photography interface, the newly deleted picture needs to be put into the recycling bin, that is, DCIM/recycled.

In Block 41, whether the number of cached pictures in the recycle bin has reached a preset number is detected, that is, 10 in the present embodiment. If yes, go to Block 42; otherwise go to Block 43.

In Block 42, the picture first put into the recycle bin is thoroughly deleted from the system.

In Block 43, the newly deleted picture is put into the recycling bin.

In Block 44, the picture deletion process is terminated.

When the user wants to retrieve the pictures recently deleted on the photography interface, the specific steps are described below.

In Block 51, the recycle bin is entered.

In Block 52, the pictures which the user wants to retrieve are found. In the present embodiment, the pictures which the user wants to retrieve can be found in the recycle bin when and only when those pictures are among the 10 pictures recently deleted on the photography interface. Those pictures in the recycle bin are recovered to original locations or are moved to other locations.

In Block 53, the picture recovering process is terminated.

As can be seen, by means of the mobile terminal-based photograph deletion method in accordance with the afore-described embodiment of the present invention, the present embodiment can not only rapidly delete the captured pictures on the photography interface, but also can retrieve the deleted pictures conveniently. This is very convenient for the user.

Figure 4:
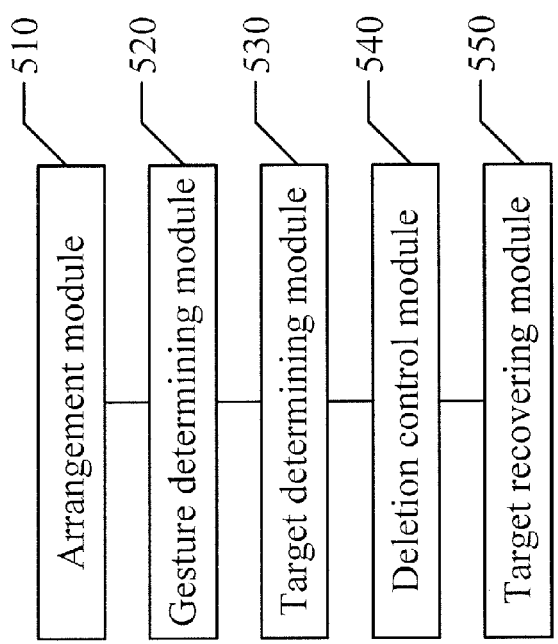
FIG. 4 is a block diagram showing a principle of a mobile terminal in accordance with an embodiment of the present invention.

On the basis of above embodiment, the present invention further provides a mobile terminal adopting the afore-described mobile terminal-based photography deletion method. As shown in FIG. 4, the mobile terminal of the present embodiment comprises the following elements.

An arrangement module 510 is utilized for pre-storing in the mobile terminal a preset touch gesture used to delete a picture on a photography interface during photography, and establishing a correspondence between the preset touch gesture and a deletion command. The arrangement module 510 is further utilized to preset are cycle bin used to cache in chronological order a preset number of pictures deleted during photography. The specific details are described in the above embodiment.

A gesture determining module 520 is utilized for receiving an operation command made by a user on a touchscreen when the mobile terminal presents the photography interface, and determining whether a user's touch gesture matches the preset touch gesture for deleting the picture. If yes, the gesture determining module 520 outputs a target determination signal to a target determining module. The specific details are described in the above embodiment.

The target determining module 530 is utilized for determining a deletion target according to action points of the user's touch gesture when the target determination signal is received. The specific details are described in the above embodiment.

A deletion control module 540 is utilized for controlling the deletion target determined by the target determining module to move to there cycle bin and controlling the mobile terminal automatically to return to photography mode when the gesture determining module determines that the user's touch gesture matches the preset touch gesture for deleting the picture. The deletion control module 540 is further utilized for controlling the mobile terminal to automatically return to photography mode when the gesture determining module determines that the user's touch gesture does not match the preset touch gesture for deleting the picture. The specific details are described in the above embodiment.

A target recovering module 550 is utilized for receiving an operation command used for the user to retrieve the pictures deleted during photography, and controlling the corresponding pictures to be recovered from the recycle bin to the place where the pictures were before the pictures were deleted or other specified locations.

Preferably, in the present embodiment, the preset touch gesture for deleting pictures is an X-shaped gesture.

Figure 5:
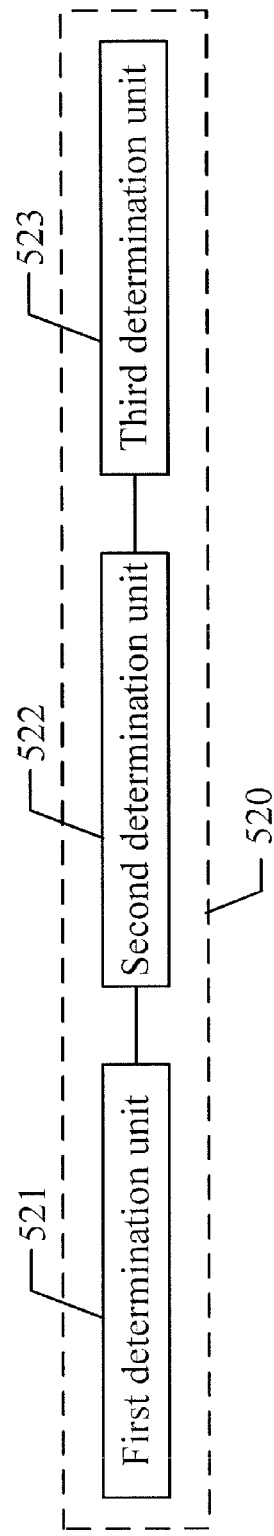
FIG. 5 is a block diagram showing a principle of a gesture determining module of a mobile terminal in accordance with an embodiment of the present invention.

As shown in FIG. 5, the gesture determining module 520 further comprises the following elements.

A first determination unit 521 is utilized for determining whether lines drawn by the user's touch gesture are two lines approximate to straight lines. If yes, the first determination unit 521 notifies a second determination unit to work; if no, the first determination unit 521 determines that the user's touch gesture does not match the X-shaped gesture for deleting the picture.

The second determination unit 522 is utilized for determining whether the two lines drawn by the user's touch gesture have only one intersection point and the intersection point is at a middle part of three equal parts of the two lines. If yes, the second determination unit 522 notifies a third determination unit to work; if no, the second determination unit 522 determines that the user's touch gesture does not match the X-shaped gesture for deleting the picture.

The third determination unit 523 is utilized for determining whether an angle between the two lines ranges from 45 to 135 degrees. If yes, the third determination unit 523 determines that the user's touch gesture matches the X-shaped gesture for deleting the picture; if no, the third determination unit 523 determines that the user's touch gesture does not match the X-shaped gesture for deleting the picture.

Preferably, the recycle bin is used to cache in chronological order 10 pictures deleted during photography.

Above all, the mobile terminal and the mobile terminal-based photography deletion method provided in the present invention utilize a simple touchscreen gesture to rapidly delete a captured picture from the photography interface. The operation is visual, the probability of error is reduced, and the mobile terminal has a new function added. By means of the present invention, the captured picture can be rapidly deleted from the photography interface without exiting the camera application program and with no need to manually switch an operation interface. Convenience is enhanced for the user.

It should be understood that the scope of the present invention is not limited to the above-described embodiments. A person of ordinary skill in this field can always make modifications or deduce alterations based on the above descriptions. All of these modifications and alterations are within the scope as defined in the appended claims of the present invention.

What is claimed is:

1. A mobile terminal-based photograph deletion method, comprising steps of:
   mapping a preset touch gesture on a touchscreen of a mobile terminal to a deletion command;
   receiving a touch gesture on an area of thumbnail view of pictures on a photography interface of the touchscreen, in which the photography interface is used to take a picture, and determining whether the touch gesture indicates a click command when the mobile terminal is used to take a photograph;
   determining whether the touch gesture matches the preset touch gesture when the touch gesture is determined not to indicate the click command;
   determining a target picture according to action points of the touch gesture made on the thumbnail view area of the photography interface when the touch gesture matches the preset touch gesture; and
   moving the target picture to a recycle bin,
   wherein the preset touch gesture is an X-shaped gesture on the touchscreen of the mobile terminal;
   wherein the step of determining whether the touch gesture matches the preset touch gesture comprises:
   determining whether the touch gesture satisfies all of the following conditions:
   (A) two lines drawn by the touch gesture are approximate to straight lines;
   (B) the two lines drawn by the touch gesture have only one intersection point and the intersection point is at a middle part of three equal parts of the two lines; and
   (C) an angle between the two lines ranges from 45 to 135 degrees;
   determining that the touch gesture matches the X-shaped gesture when all three of the conditions (A), (B), and (C) are satisfied, and determining that the touch gesture does not match the X-shaped gesture when any one of the three conditions (A), (B), and (C) is not satisfied;

wherein in Condition (A), whether lines drawn by the user are two lines approximate to straight lines is determined by determining whether the straightness of the lines drawn by the user meets the requirement, the straightness is defined by the maximum of a ratio of the sum of the distance between a point of a line and a start point of the line and the distance between said point and an end point of the line to the distance between the start point and the end point;

wherein determining whether the straightness of the lines drawn by the user meets the requirement comprises steps of:

Step 0: defining a criteria for the straightness;

Step 1: calculating the distance between the start point and the end point respectively for the two lines;

Step 2: calculating the sum of the distance between a point and the start point on a corresponding line and the distance between said point and the end point on the corresponding line respectively for the respective points on the two lines;

Step 3: comparing the distance sum calculated in Step 2 and the distance calculated for the corresponding line in Step 1, and finding out the maximum of its ratio;

wherein if the maximum ratio in Step 3 is larger than the straightness criteria, it shows that the corresponding line is not approximate to a straight line, and the corresponding line is determined not to meet the requirement.

2. The mobile terminal-based photograph deletion method according to claim 1, wherein the target picture comprises a picture or a short film.

3. The mobile terminal-based photograph deletion method according to claim 1, further comprising a step of receiving a target retrieving command by the mobile terminal for recovering the target picture from the recycle bin to a location where the target picture was before the target picture was moved to the recycle bin or a specified location after the step of moving the target picture to the recycle bin.

4. The mobile terminal-based photograph deletion method according to claim 1, wherein the recycle bin caches a preset number of the target pictures in chronological order.

5. The mobile terminal-based photograph deletion method according to claim 4, wherein the step of moving the target picture to the recycle bin comprises:

when the number of the cached target pictures in the recycle bin has reached the preset number, deleting a foremost cached target picture from the recycle bin and then moving the target picture to the recycle bin.

6. A mobile terminal-based photograph deletion method, comprising steps of:

mapping a preset touch gesture on a touchscreen of a mobile terminal to a deletion command;

receiving a touch gesture on an area of thumbnail view of pictures on a photography interface of the touchscreen, in which the photography interface is used to take a picture, and determining whether the touch gesture matches the preset touch gesture when the mobile terminal is used to take a photograph;

determining a target picture according to action points of the touch gesture made on the thumbnail view area of the photography interface when the touch gesture matches the preset touch gesture; and moving the target picture to a recycle bin, wherein the preset touch gesture is an X-shaped gesture on the touchscreen of the mobile terminal;

wherein the step of determining whether the touch gesture matches the preset touch gesture comprises:

determining whether the touch gesture satisfies all of the following conditions;

(A) two lines drawn by the touch gesture are approximate to straight lines;

(B) the two lines drawn by the touch gesture have only one intersection point and the intersection point is at a middle part of three equal parts of the two lines; and (C) an angle between the two lines ranges from 45 to 135 degrees;

determining that the touch gesture matches the X-shaped gesture when all three of the conditions (A), (B), and (C) are satisfied, and determining that the touch gesture does not match the X-shaped gesture when any one of the three conditions (A), (B), and (C) is not satisfied;

wherein in Condition (A), whether lines drawn by the user are two lines approximate to straight lines is determined by determining whether the straightness of the lines drawn by the user meets the requirement, the straightness is defined by the maximum of a ratio of the sum of the distance between a point of a line and a start point of the line and the distance between said point and an end point of the line to the distance between the start point and the end point;

wherein determining whether the straightness of the lines drawn by the user meets the requirement comprises steps of:

Step 0: defining a criteria for the straightness;

Step 1: calculating the distance between the start point and the end point respectively for the two lines;

Step 2: calculating the sum of the distance between a point and the start point on a corresponding line and the distance between said point and the end point on the corresponding line respectively for the respective points on the two lines;

Step 3: comparing the distance sum calculated in Step 2 and the distance calculated for the corresponding line in Step 1, and finding out the maximum of its ratio;

wherein if the maximum ratio in Step 3 is larger than the straightness criteria, it shows that the corresponding line is not approximate to a straight line, and the corresponding line is determined not to meet the requirement.

7. The mobile terminal-based photograph deletion method according to claim 6, wherein the target picture comprises a picture or a short film.

8. The mobile terminal-based photograph deletion method according to claim 6, further comprising a step of receiving a target retrieving command by the mobile terminal for recovering the target picture from the recycle bin to a location where the target picture was before the target picture was moved to the recycle bin or a specified location after the step of moving the target picture to the recycle bin.

9. The mobile terminal-based photograph deletion method according to claim 6, wherein the recycle bin caches a preset number of the target pictures in chronological order.

10. The mobile terminal-based photograph deletion method according to claim 9, wherein the step of moving the target picture to the recycle bin comprises:

when the number of the cached target pictures in the recycle bin has reached the preset number, deleting a foremost cached target picture from the recycle bin and then moving the target picture to the recycle bin.

11. A mobile terminal, comprising:
a processor; and
a memory connected with processor, the memory comprising a plurality of program instructions executable by the processor, the plurality of program instructions comprising:
establishing a correspondence between a preset touch gesture on a touch screen of a mobile terminal and a deletion command;
receiving a touch gesture on an area of thumbnail view of pictures on a photography interface of the touchscreen, in which the photography interface is used to take a picture, and determining whether the touch gesture matches the preset touch gesture when the mobile terminal is used to take a photograph; if yes, outputting a target determination signal;
receiving the target determination signal, and in responsive to the target determination signal, determining a target picture according to action points of the touch gesture made on the thumbnail view area of the photography interface; and
moving the target picture to a recycle bin when the touch gesture matches the preset touch gesture,
wherein the preset touch gesture is an X-shaped gesture on the touchscreen of the mobile terminal;
wherein determining whether the touch gesture matches the reset touch gesture comprises:
determining whether the touch gesture satisfies all of the following conditions;
(A) two lines drawn by the touch gesture are approximate to straight lines;
(B) the two lines drawn by the touch gesture have only one intersection point and the intersection point is at a middle part of three equal parts of the two lines; and
(C) an angle between the two lines ranges from 45 to 135 degrees;
determining that the touch gesture matches the X-shaped gesture when all three of the conditions (A), (B), and (C) are satisfied, and determining that the touch gesture does not match the X-shaped gesture when any one of the three conditions (A), (B), and (C) is not satisfied;
wherein in Condition (A), whether lines drawn by the user are two lines approximate to straight lines is determined by determining whether the straightness of the lines drawn by the user meets the requirement, the straightness is defined by the maximum of a ratio of the sum of the distance between a point of a line and a start point of the line and the distance between said point and an end point of the line to the distance between the start point and the end point;
wherein determining whether the straightness of the lines drawn by the user meets the requirement comprises steps of:
Step 0: defining a criteria for the straightness;
Step 1: calculating the distance between the start point and the end point respectively for the two lines;
Step 2: calculating the sum of the distance between a point and the start point on a corresponding line and the distance between said point and the end point on the corresponding line respectively for the respective points on the two lines;
Step 3: comparing the distance sum calculated in Step 2 and the distance calculated for the corresponding line in Step 1, and finding out the maximum of its ratio;
wherein if the maximum ratio in Step 3 is larger than the straightness criteria, it shows that the corresponding line is not approximate to a straight line, and the corresponding line is determined not to meet the requirement.

12. The mobile terminal according to claim 11, wherein the target picture comprises a picture or a short film.

13. The mobile terminal according to claim 11, wherein the plurality of program instructions further comprises:
receiving a target retrieving command and recovering the target picture from the recycle bin to a location where the target picture was before the target picture was moved to the recycle bin or a specified location; and
presetting the recycle bin used to cache a preset number of target pictures in chronological order.

14. The mobile terminal according to claim 13, wherein the preset number is 10.

* * * * *